United States Patent
Peterson et al.

(10) Patent No.: US 6,518,914 B1
(45) Date of Patent: Feb. 11, 2003

(54) SYNTHETIC APERTURE RADAR SYSTEM CAPABLE OF DETECTING MOVING TARGETS

(75) Inventors: Mats Peterson, Linköping (SE); Hans Hellsten, Linköping (SE); Lars Ulander, Linköping (SE)

(73) Assignee: Totalförsvarets Forskningsinstitut, Stockholm (SE)

( * ) Notice: Subject to any disclaimer, the term of this patent is extended or adjusted under 35 U.S.C. 154(b) by 0 days.

(21) Appl. No.: 09/703,621

(22) Filed: Nov. 2, 2000

(51) Int. Cl.⁷ .............................................. G01S 13/90
(52) U.S. Cl. ...................... 342/25; 342/162; 342/195
(58) Field of Search ............................. 342/25, 89, 90, 342/91, 92, 93, 98, 99, 102, 115, 159, 160, 161, 162, 191, 192, 194, 195, 196

(56) References Cited

U.S. PATENT DOCUMENTS

| | | | |
|---|---|---|---|
| 4,866,446 A | | 9/1989 | Hellsten ...................... 342/25 |
| 4,965,582 A | | 10/1990 | Hellsten ...................... 342/25 |
| 5,442,364 A | * | 8/1995 | Lee et al. ................... 342/372 |
| 5,805,098 A | * | 9/1998 | McCorkle ..................... 342/25 |
| 5,898,399 A | * | 4/1999 | Carrara et al. ................ 342/25 |
| 5,969,662 A | * | 10/1999 | Hellsten ...................... 342/25 |
| 6,300,914 B1 | * | 10/2001 | Yang .......................... 343/741 |
| 6,384,766 B1 | * | 5/2002 | Ulander ....................... 342/25 |
| 6,388,605 B1 | * | 5/2002 | Petz et al. .................... 342/25 |
| 6,388,606 B1 | * | 5/2002 | Keydel et al. ................. 342/25 |

FOREIGN PATENT DOCUMENTS

| SE | 8406007-8 | 9/1988 |
|---|---|---|
| SE | 9503275 | 9/1995 |

OTHER PUBLICATIONS

Pettersson; Focusing of Moving Targets in an Ulrs–wide Band Sar Gmti System; Eusar 2000, 3rd European Conference on Synthetic Aperture Radar; 5/2000; p. 837–840.

Ulander et al.; Synthetic–aperture Radar Processing Using Fast Factorised Backprojection; Eusar 2000, 3rd European Conference on Synthetic Aperture Radar; 5/2000; p. 753–756.

* cited by examiner

Primary Examiner—John B. Sotomayor
(74) Attorney, Agent, or Firm—Jacobson Holman PLLC

(57) ABSTRACT

A Synthetic Aperture Radar (SAR) system and method capable of detecting moving targets which includes a platform that moves over a number of objects, such as a ground surface, and supports radar equipment which reproduces the objects by means of a fast backprojection synthetic aperture technique via at least two antennas without requirement as to directivity or fractional bandwidth. The imaging process is divided into three steps which are carried out in a determined order, the steps and the order being formation of sub-aperture beams at one speed, performing clutter suppression, and detection of moving targets.

13 Claims, 9 Drawing Sheets

SYNTHETIC APERTURE RADAR SYSTEM CAPABLE OF DETECTING MOVING TARGETS

BACKGROUND OF THE INVENTION

1. Field of the Invention

The present invention relates to a Synthetic Aperture Radar (SAR) System capable of detecting moving targets. The system has no requirement as to directivity or fractional bandwidth. It is therefore possible to use it with an Ultra Wide Band (UWB) SAR system and Wide Beam (WB) transmission and reception. A UWB-WB SAR at low frequencies will add the capability to detect targets moving in forested areas, and at microwave frequencies it will give the capability of high resolution images of the moving target.

2. Description of the Related Art

Today there only exists UWB-WB systems at low frequencies, but in time there will be systems also at higher frequencies. The low frequency UWB-WB SAR system has shown its effectiveness to detect concealed targets. This unique capability is a result of the low frequencies in combination with the relatively high resolution that a UWB-WB SAR sensor gives. This has been successfully demonstrated for instance in the CARABAS™ system, Swedish patent 8406007-8 (456 117) and U.S. Pat. Nos. 4,866,446 and 4,965,582 all incorporated by reference herein. The resolution in the CARABAS™ system is smaller than the center frequency wavelength. To reach this high resolution a very large integration time is needed which demands good motion compensation. Fourier-domain techniques do not adapt to this problem very well, so resolution is reached by time domain backprojection. Fast backprojection techniques (a domain of methods), such as local backprojection (LBP), described i.a. in the Swedish public patent application 9503275-1 and U.S. Pat. No. 5,969,662 both incorporated by reference herein, and factorized backprojection (FBP), described in "L. M. H. Ulander, H. Hellsten, G. Stenström: Synthetic Aperture Radar Processing Using Fast Factorised Backprojection, Proc. of EUSAR 2000, $3^{rd}$ European Conference on Synthetic Aperture Radar, Germany, pp. 753–756, which is incorporated by reference herein, are approximate and much faster then the global backprojection (GBP).

In UWB-WB SAR only one scatter can appear in the resolution cell and therefore no speckle noise is seen in the images. In particular at low frequencies the radar signal will be stable. Objects that cause radar reflection have a physical size of the wavelength and larger. Low frequency scatters are meters in size, and these large objects do not move between the occasions. As an example, in forests it is not the leaves or branches which cause the reflection, but rather the stable ground-trunk that is the major backscatter contributor.

Detection of moving targets requires maximization of the target signal compared to the clutter signal. In order to filter the strong clutter signal from stationary objects, the displaced-phase-center-antenna (DPCA) method was developed. This technique needs strict spatial alignment and system stability. In the extension of adaptive antenna technique the space-time adaptive processing (STAP) was found. The STAP is not only adaptive, in the space-time two-dimensional space the clutter spectrum is basically a narrow ridge, so that slow moving targets can be detected.

Clutter suppression by GMTI filtering has in latest years developed in combination with SAR. In a SAR GMTI system the moving target will not only be detected, but also imaged to high resolution in its surroundings. Movement of a target will influence the focusing in the SAR process of the moving target compared to its surroundings. The moving target will be smeared and shifted in location. For SAR with a side-looking narrow beam antenna system these effects are known, and methods for detection of slow moving targets has also been proposed.

In the latest years there has been ongoing development to detect, focus and evaluate velocity components of a moving target in a SAR system. The idea is to use multi-channel antenna arrays to suppress the clutter signal from the stationary objects. The main detection scheme is to compare the likelihood ratio test with a threshold. Later experimental results have shown that SAR GMTI is a strong tool to detect and image moving targets in its surrounding. However, even in these narrow beam microwave systems, compensation in Doppler frequency is needed. In one known system the test statistics are first filtered for each Doppler frequency, and in another system antenna pattern was compensated in the Doppler domain.

SUMMARY OF THE INVENTION

The present invention gives a solution to the problem of detecting moving targets irrespective of fractional bandwidth and antenna directivity, by being designed using a synthetic aperture radar (SAR) system capable of detecting moving targets. The SAR system comprises a platform which moves over a number, which can be very large, of objects, e.g., in the form of a ground surface, and supports radar equipment which reproduces the objects by means of a fast backprojection synthetic aperture technique via at least two antennas, without requirement as to directivity or fractional bandwidth. According to the system, a signal-processing device operates by dividing the imaging process into three steps which are carried out in a determined order. The steps and the order are formation of sub-aperture beams at one speed, performing of clutter suppression, i.e., GMTI filtering, and detection of moving targets.

BRIEF DESCRIPTION OF THE DRAWINGS

The invention will be described below in more detail with reference to the accompanying drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
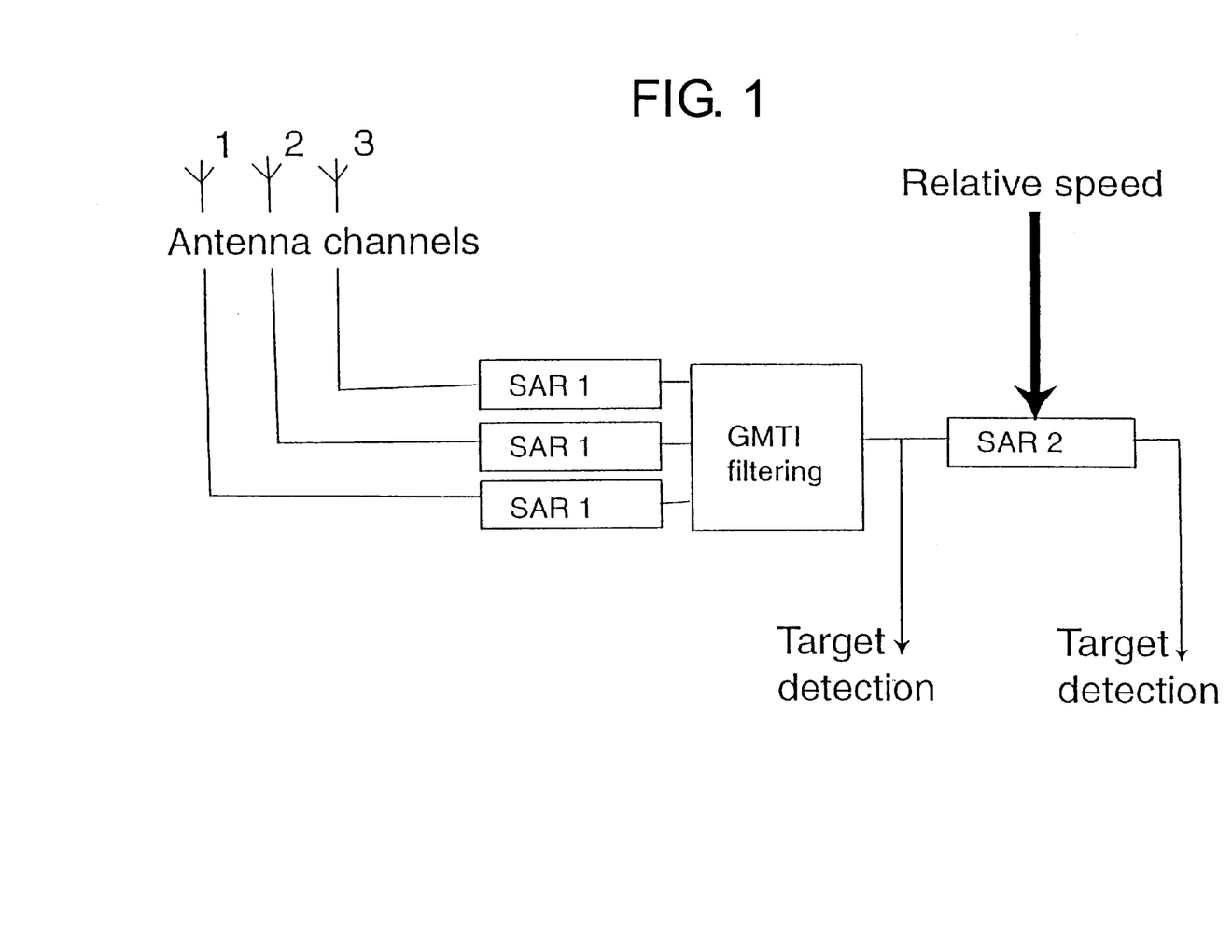
FIG. 1 shows a SAR system according to the invention, FIG. 2 defines the co-ordinate system used in this presentation around a SAR system in an aircraft.

The invention uses the approach to combine the fast backprojection techniques with GMTI. The goal is to provide the extreme motion compensation needed in a UWB-WB SAR system and to save computational load both in the SAR processing and the process to focus moving targets at different relative speeds In fast backprojection methods, the SAR process has two steps, beam forming and image formation. Because of the linear nature of a GMTI filter and the SAR process, it is possible to carry out the processing steps in arbitrary order. The basis for the invention is the appreciation of the fact that the imaging process may be divided into three steps which are carried out in a determined order, the steps and the order being formation of sub-aperture beans at one speed, performing clutter suppression, i.e., GMTI filtering, and detection of moving targets. When necessary in order to get a high enough signal to clutter and noise ratio, the detection of moving targets comprises combining the sub-aperture beams by relative speed. FIG. 1 shows a SAR system of this type.

The speed normally chosen for the formation of sub-aperture beams is the platform speed or, as seen from the platform, the ground speed. In the following calculations the speed is chosen in this way. The method is, however, not limited to this. It is possible to choose an arbitrary speed for the initial calculations. A simple adjustment of the definition of relative speed in the following equations is all that is needed.

The maximum likelihood ratio test is from the sub-aperture beams. The test performs clutter suppression in the sub-aperture beams and combines the clutter suppressed beams to a test image. The proposed target detection method thus forms sub-aperture beams at one speed, suitably ground speed, perform clutter suppression, and finally combine the sub-aperture beams by relative speed, which is the same as to SAR process a moving target. This means that for all tested relative speeds the same clutter suppressed sub-aperture beams are used. The once computed beams saves computational resources.

The invention will now be described in greater detail. First the SAR processing algorithm will be discussed. There are many different such algorithms. The choice of algorithm is dependent on system configuration, the processing load and the quality of the end product. In UWB-WB SAR systems it has been found that time domain backprojection algorithms are a good choice, due to the capability to handle extreme range migration and motion compensation needed for the wide antenna aperture. The time domain algorithms originate from the GBP. Because the processing load of GBP is extreme for large images with large apertures, there have been faster time domain algorithms developed. Two such fast backprojection algorithms are LBP and FBP. The LBP is easier to understand and it has therefore been chosen in the following. It is, however, also possible to use other fast back-projection algorithms in connection with the invention.

1 The LBP

Figure 2:
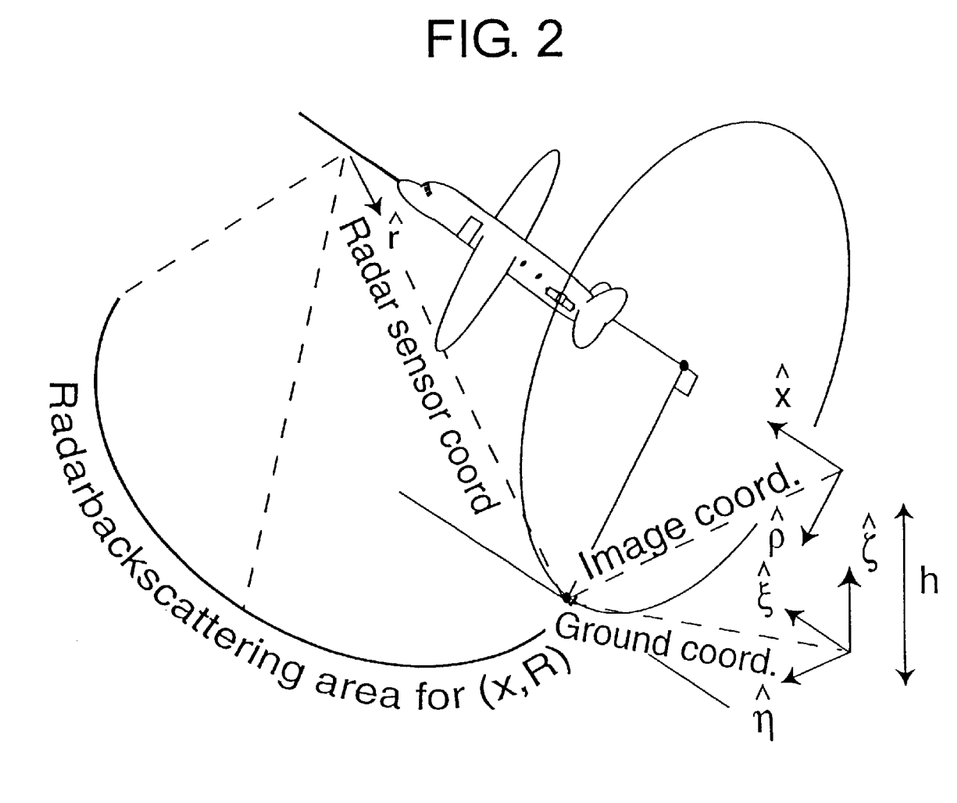

Consider FIG. 2. A point target at ground position go, $\xi_0$, $\eta_0$, $\zeta_0$ has for a non-moving target image position $x_0 = \xi_0$ and $\rho_0 = \sqrt{\eta_0^2 + h^2}$ (to simplify we assume $\zeta_0 = 0$). Let g(x, R) be the output from the radar sensor at point (x,R) given by $$g(x, R) = \frac{p\left(R - \sqrt{(x-x_0)^2 + \rho_0^2}\right)}{\sqrt{(x-x_0)^2 + \rho_0^2}} \quad (1)$$

where p(R) is the compressed pulse of a point target. The GBP is found from $$h(x, \rho) = \int_{-\infty}^{\infty} g\left(x', \sqrt{(x'-x)^2 + \rho^2}\right) dx' \quad (2)$$

after post-processing h(x, ρ) with a ramp-filter in frequency domain.

Figure 3:
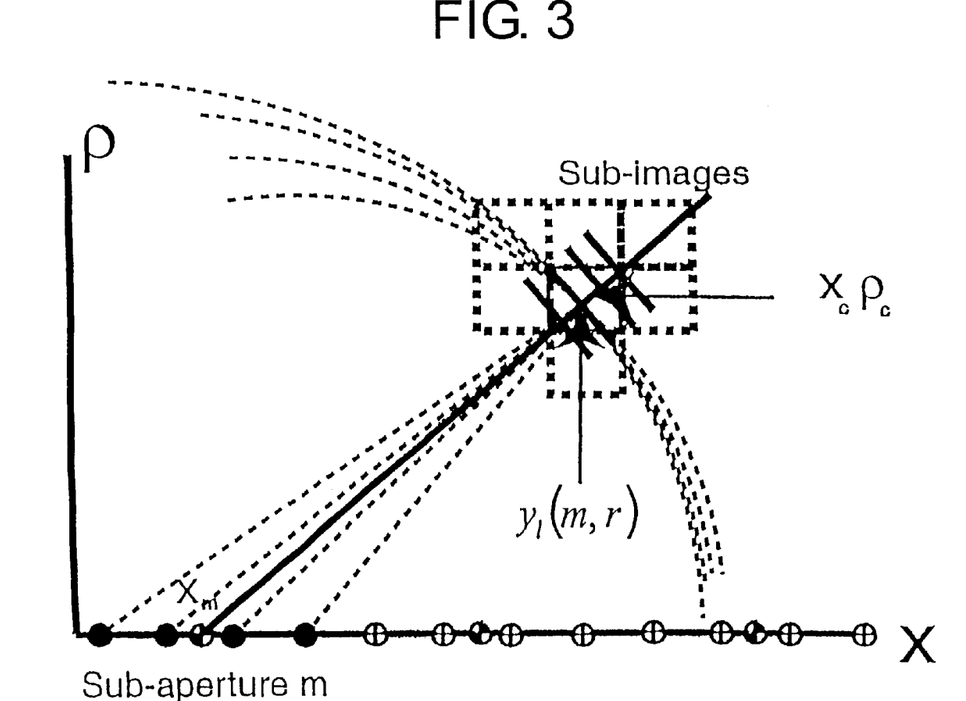
FIG. 3 shows the sub-aperture beam for one sub-aperture over one sub-image.

Consider a target located in a sub-image with center coordinates $\rho_c$ and $x_c$. In LBP the integral (2) is solved approximately, for this particular sub-image, over M sub-apertures with center coordinate $x_m$, cf. FIG. 3. The sub-image and the sub-aperture are chosen so small that the range distance can be approximated as a linear function. The LBP at (x, ρ) for a point target in ($x_0$, $\rho_0$) is given by $$h(x, \rho) = \sum_{m=1}^{M} \int_{(x_m - \frac{L_s}{2})}^{(x_m + \frac{L_s}{2})} g\left(x', R_{cm} + \frac{(\Delta x' - \Delta x)(x_m - x_c) + \Delta \rho \rho_c}{R_{cm}}\right) dx' , \quad (3)$$

where $R_{cm} = \sqrt{(x_c - x_m)^2 + \rho_c^2}$, $\Delta x = (x - x_c)$, $\Delta x' = (x' - x_m)$, and $\Delta \rho = (\rho - \rho_c)$.

In LBP the sub-images and sub-aperture size $L_s$ are so small that the sub-aperture integral is approximately one dimensional, and will in the following be called sub-aperture beam $$y_l(m, r) = \int_{(x_m - \frac{L_s}{2})}^{(x_m + \frac{L_s}{2})} g\left(x', R_{cm} + r + \frac{x_m - x_c}{R_{cm}} \Delta x'\right) dx'. \quad (4)$$

The local beam index l is the antenna channel, m the sub-aperture number and r the local distance in the local beam. The LBP can then be rewritten in terms of sub-aperture beams $$h_l(x, \rho) = \sum_{m=1}^{M} y_l\left(m, \frac{\Delta x(x_m - x_c) + \Delta \rho \rho_c}{R_{cm}}\right). \quad (5)$$

2 Displacement of moving targets

Figure 4:
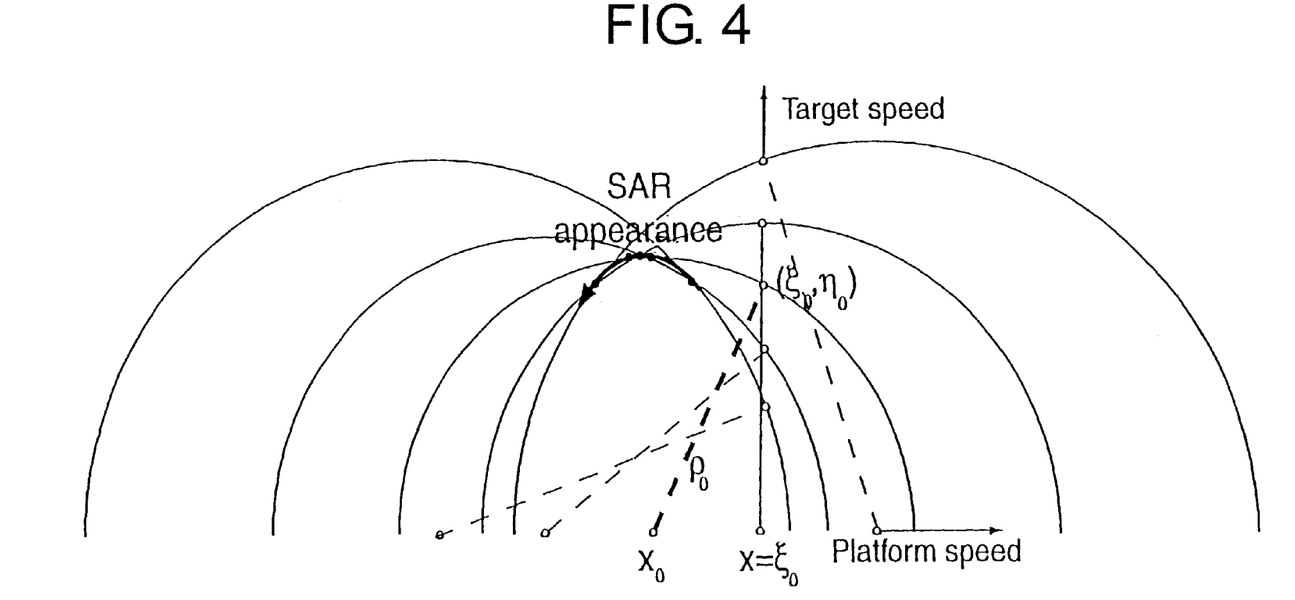
FIG. 4 shows the displacement and defocusing of a moving target.

A moving target will be displaced and unfocused in the SAR image, cf. FIG. 4. Because the range history is independent of the coordinate system the displacement in a UWB-WB SAR system can be found from the distance relation between image coordinates and ground coordinates $$\sqrt{\gamma^2(x(t)-x_0)^2 + \rho_0^2} = \sqrt{(x(t)-\xi(t))^2 + \eta^2(t) + h^2} \quad (6)$$

Here, γ is the relative speed, ξ and η are ground coordinates of the moving target, and h is the flight altitude. We assume linear motion of the platform, $x(t) = v_p t$, and the moving target $\xi(t) = v_\xi(t-t_0) + \xi_0$, $\eta(t) = v_\eta(t-t_0) + \eta_0$. The coordinates $\xi_0$, $\eta_0$ and the time $t_0$ are connected to the minimum range $\rho_0$, and they can easily be found for any linear motion. The distance relation in (6) gives $$\gamma^2 = \frac{(v_p - v_\xi)^2 + v_\eta^2}{v_p^2} \quad (7)$$

$$x_0 = \xi_0 - \frac{v_\eta}{v_p - v_\xi} \eta_0 \quad (8)$$

$$\rho_0 = \sqrt{\eta_0^2 \left(1 + \left(\frac{v_\eta}{v_p - v_\xi}\right)^2\right) + h^2} \quad (9)$$

In the other channels, the moving target appears at positions separated from the first channel. The separation is given by the time difference when the minimum distance occurs in the spatially separated antenna channels. If the separation between the channels antenna phase centers is $d_l$ the separation time $\Delta t_l$ is found from (6) to be $$\Delta t_l = \frac{d_l(v_p - v_\xi)}{(v_\xi - v_p)^2 + v_\eta^2}. \quad (10)$$

From the separation time the moving target appearance shift in each channel is easily found using (8) and (9).

$$\Delta x_{0l} = \left(v_\xi - \frac{v_\eta^2}{v_p - v_\xi}\right) \Delta t_l \quad (11)$$

$$\Delta \rho_{0l} \approx v_\eta \frac{\eta_0}{\rho_0} \left(1 + \frac{v_\eta^2}{(v_p - v_\xi)^2}\right) \Delta t_l, \quad (12)$$

where the approximation $v_\eta \Delta t_l \ll \eta_0$ is valid for almost all radar cases. When the approximation is valid the position separation between the channels is linear dependent on the antenna spatial separation.

3 Focusing moving targets

To focus the moving target we have to SAR process with correct relative speed. Above it has been stated that the invention does not us the straight forward method of applying LBP by re-computing the local beams and to repeating the GMTI process. Instead a method to focus SAR images at γ using local beams processed for ground speed i.e. γ=1 is used.

Figure 5:
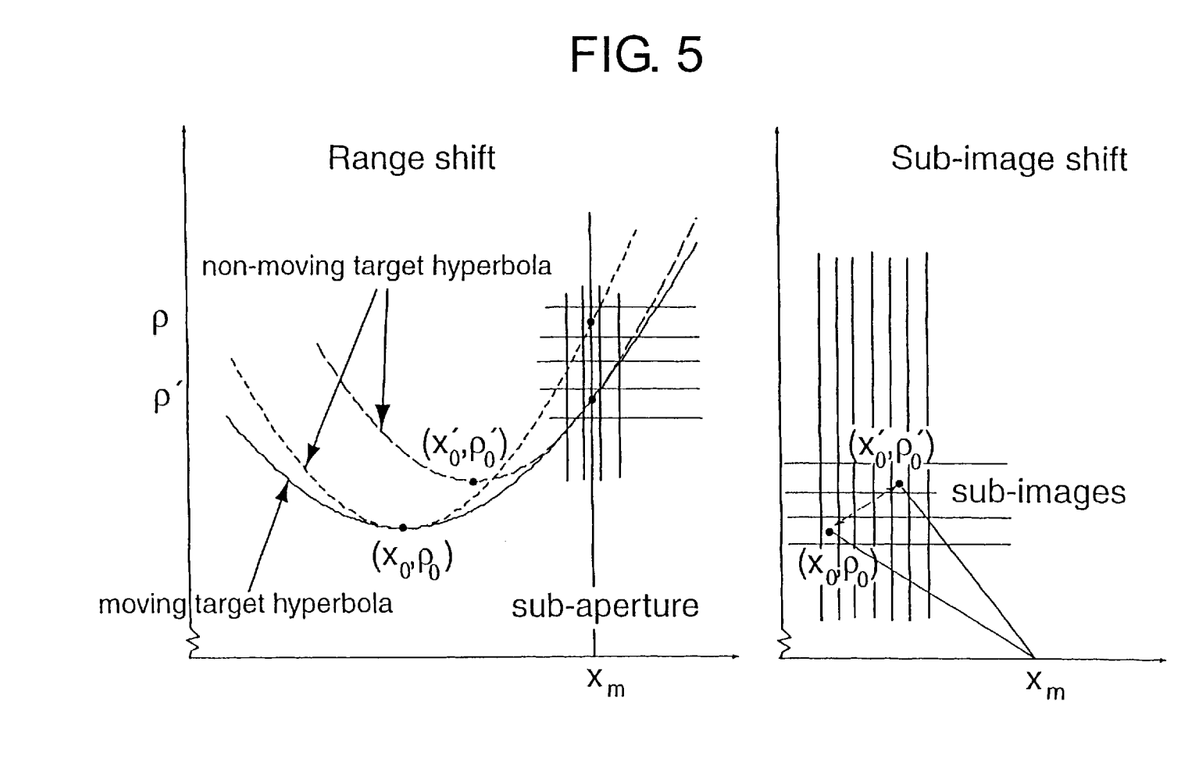
FIG. 5 shows focusing with relative speed γ, using ground speed local beams.

In LBP (5) we sum local beams over the hyperbola in ($x_0$, $\rho_0$), see FIG. 5. If the target is moving we can still find the moving target hyperbola in the local beams processed for γ=1. However, this needs distance compensation and a sub-image shift, because if the moving target moves fast enough it will appear in different sub-images.

Assume a moving target with minimum range $\rho_0$ at $x_0$, see FIG. 5. To find the sub-image and range shift at $x_m$, we compute a point ($x_0''$, $\rho_0'$), chosen such that the local beam over a virtual non-moving target at ($x_0'$, $\rho_0'$) is the same as for the moving target at ($x_o$, $\rho_o$). Equal range and range derivative for the moving and non moving target gives $$\sqrt{\gamma^2(x_m - x_0)^2 + \rho_0^2} = \sqrt{(x_m - x_0')^2 + \rho_0'^2} \quad (13)$$

$$(x_m - x'_o) = \gamma^2(x_m - x_0) \quad (14)$$

Solving (13) and (14) we get $x_0'$ and $\rho_0'$ as functions of $x_m$, $x_0$, $\rho_0$ and γ. The distance shift for a local beam is given by $$\Delta r_m = \sqrt{(x_m - x_0)^2 + \rho_0^2} - \sqrt{(x_m - x'_0)^2 + \rho_0'^2} \quad (15)$$

For moving targets with high speed and long integration time, $\Delta r_m$ will change so much that the point ($x_0'$, $\rho_0'$) changes its location from one sub-image to a neighboring sub-image. When it does, there will be a sub-image shift. The used $y_l(m,r)$ is changed to the $\hat{y}_l(m,r)$ connected to that particular sub-image.

4 Moving target detection

To detect ground moving targets we have to separate the moving targets from their surroundings. An antenna system with spatial separated antenna channels will have this capability. In a UWB-WB system all channels will contain the same information, except for the moving targets. The moving targets will displace their position in the SAR image compared to the surrounding clutter. They will also change their position between the spatial channels in comparison to the clutter. The channels measure the same clutter at one and the same spatial position. With time the moving target will change its position between the channels.

Figure 6:
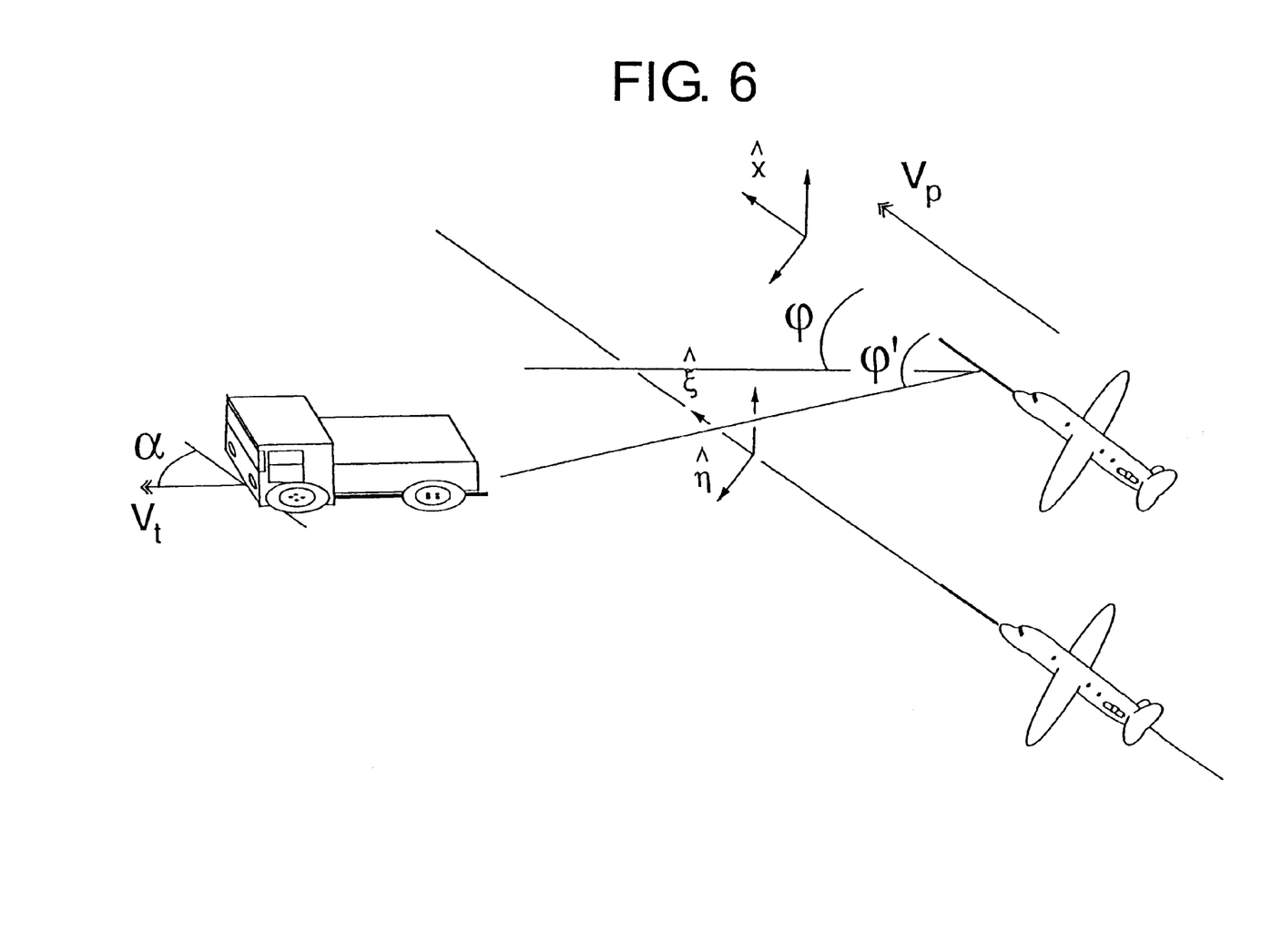
FIG. 6 shows the geometry of a moving target.

The geometry of the SAR platform and the moving target is given in FIG. 6. The speed of the target is here given by the speed $v_t$ and heading α. As before we assume linear motion. The Doppler angle φ relates to non-moving clutter that has the same Doppler as the moving target. The moving target will appear in the sub-aperture connected to φ. The angle to the moving target is given by φ'.

Suppose we want to test if there is a moving target present in an area. In UWB-WB systems it is a benefit to use sub-aperture beams processed for ground speed for moving target detection. This to compensate frequency and angle dependent mis-match in the system, save processing load and reduce data complexity.

The illuminated area is divided into sub-images that are connected to sub-aperture beams $y_l(m,r)$. If a moving target is present, the local beams consist of a moving target $z_l(m,r)$, clutter $\eta(m,r)$ and white noise independent of direction n(r). The local beam $y_l(m,r)$ under the two hypotheses, $H_0$ no target present and, $H_1$ target present are $$H_0: y_l(m,r) = \alpha_l^c(m,r) * \eta(m,r) + n_l(r) \quad (16)$$

$$H_1: y_l(m,r) = \alpha_l^t(m,r) * z_l(m,r) + \alpha_l^c(m,r) * \eta(m,r) + n_l(r) \quad (17)$$

where * is convolution, $\alpha_l^c(r)$ is the system influence on the clutter, and $\alpha_l^t(r)$ similarly for the target. These functions differ because of the different origin directions of the target and the clutter in the sub-aperture beam, see section 3 above. The measurements in the radar system will be sampled signals so we will in the following use the sampled sub-aperture beam $y_l(m,r_n)$.

Range or time domain filtering in UWB systems puts very high demands on the system calibration. Experience from wide band jammer suppression in a UWB system indicates that the filtering should be done in frequency domain. Let the system have L antenna channels. The received signal under the two hypotheses $H_0$ and $H_1$ in frequency domain are $$H_0: y_l(+ik) = A_l^c(+ik)\eta_l(+ik) + n_l(+ik) \quad (18)$$

$$H_1: y_l(+ik) = A_l^t(+ik)s(+ik)e^{i\phi(k)}e^{i(r(k)+(l-1)\Delta)k} + A_l^c(+ik)\eta_l(+ik) + n_l(k) \quad (19)$$

where k is the wave vector dependent on the wave number k and index m (dependent on Doppler angle φ), Δ denotes the movement of the moving target between the spatial channels, $A_l^c(k)$ is the frequency function of the system in the clutter direction, $A_l^t(k)$ is the frequency function of the system in the target direction, s(k) is the amplitude and φ(k) is the phase of the target scattering.

Figure 7:
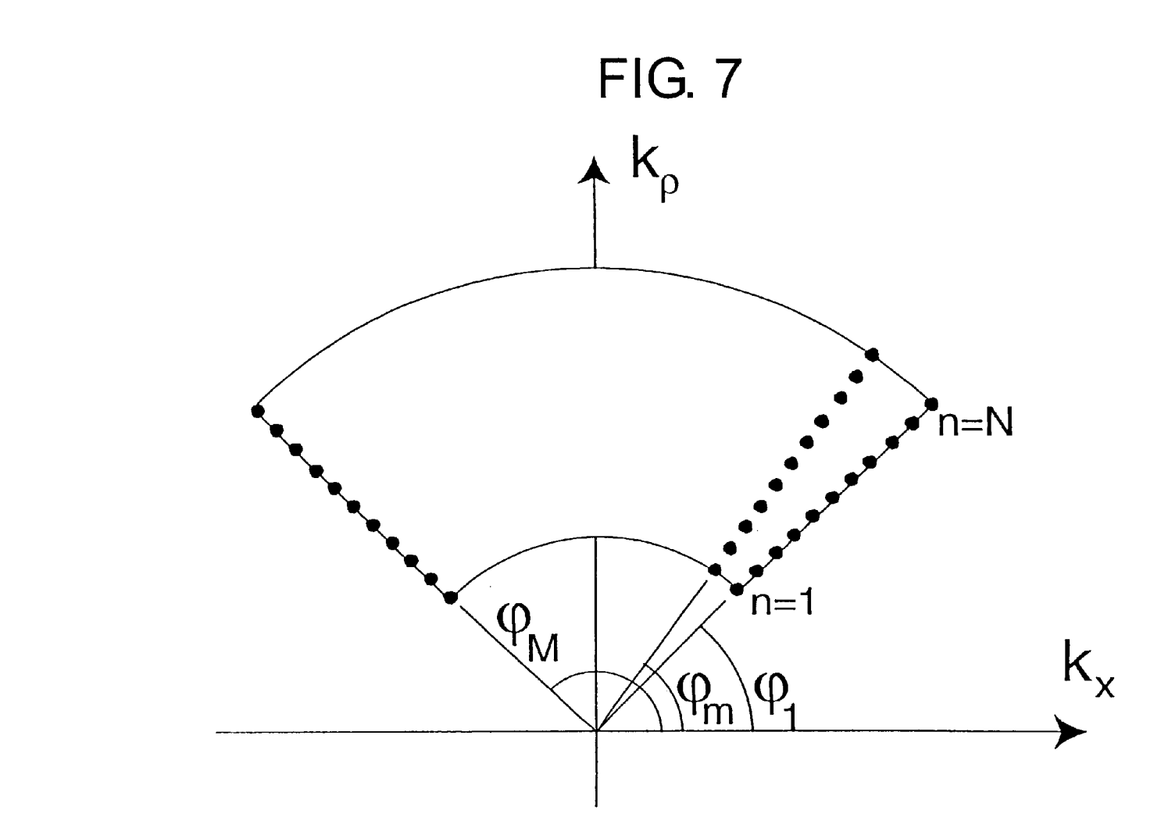
FIG. 7 shows the image wave vector space.

Working with sub-aperture beams it is preferred to use a polar coordinate system wave vector domain, where $\vec{k}$ is expressed as $\hat{k}$ and $\hat{\phi}$ (the same angle as $\phi$, in means of stationary phase). The wave number index in radial direction is n and in the angle direction m. Wave number domain of the sub aperture beams connected to one sub image is seen in FIG. 7.

The measurement vector in wave vector domain for all channels L and all sampled frequency transformed sub aperture beams is $$\tilde{Y} = \begin{bmatrix} Y_1(k_1, \varphi_1, \varphi'_1) \\ Y_2(k_1, \varphi_1, \varphi'_1) \\ \vdots \\ Y_L(k_1, \varphi_1, \varphi'_1) \\ Y_1(k_2, \varphi_1, \varphi'_1) \\ \vdots \\ Y_L(k_N, \varphi_1, \varphi'_1) \\ \vdots \\ Y_L(k_N, \varphi_M, \varphi'_M) \end{bmatrix} = \tilde{A} + \tilde{\eta} + \tilde{n} \quad (20)$$

where $\eta$ and $\tilde{n}$ is the clutter and noise vector, respectively. Let us assume that $A_l^t(\vec{k}) = A_l^c(\vec{k}) = 1$ over the used wave numbers. The signal vector is given by $$\tilde{A} = \begin{bmatrix} e^{j\phi(k_1,\varphi'_1)}s(k_1,\varphi'_1)e^{-jk_1r(\varphi'_1)} \\ e^{j\phi(k_1,\varphi'_1)}s(k_1,\varphi'_1)e^{-jk_1(r(\varphi'_1)+d(\cos\varphi_1-\cos\varphi'_1))} \\ \vdots \\ e^{j\phi(k_1,\varphi'_1)}s(k_1,\varphi'_1)e^{-jk_1(r(\varphi'_1)+(L-1)d(\cos\varphi_1-\cos\varphi'_1))} \\ e^{j\phi(k_2,\varphi'_1)}s(k_2,\varphi'_1)e^{-jk_2r(\varphi'_1)} \\ \vdots \\ e^{j\phi(k_N,\varphi'_1)}s(k_N,\varphi'_1)e^{-jk_N(r(\varphi'_1)+(L-1)d(\cos\varphi_1-\cos\varphi'_1))} \\ \vdots \\ e^{j\phi(k_N,\varphi'_M)}s(k_N,\varphi'_M)e^{-jk_N(r(\varphi'_M)+(L-1)d(\cos\varphi_M-\cos\varphi'_M))} \end{bmatrix} \quad (21)$$

The moving target will in the sub-aperture beams perform a local range walk given by $r(\phi_m)$. The walk is dependent on the range migration, which depends on the relative speed (7).

To test if there is a target present we use the likelihood ratio test. The likelihood ratio is denoted $$\Lambda = \frac{P(\tilde{Y} \mid H_1)}{P(\tilde{Y} \mid H_0)} \quad (22)$$

The probability density function (pdf) of the noise $\bar{n}_l(r_n)$ is Gaussian. The resolution in each radar output is poor compared to the center wavelength, and for that reason the resolution cell contains many scatters. It is then appropriate to assume $\bar{\rho}(m, r_n)$ pdf as Gaussian. The transformation from range to frequency domain of a sequence is a summation, and a summation of Gaussian variables is Gaussian. The pdf of the clutter $\eta$ and noise $\tilde{n}$ is believed to be Gaussian. Then under $H_0$:

$$P(\tilde{Y} \mid H_0) = \frac{1}{(2\pi)^{NM}|\tilde{C}|} e^{-\tilde{Y}^H \tilde{C}^{-1} \tilde{Y}} \quad (23)$$

and under $H_1$:

$$P(\tilde{Y} \mid H_1) = \frac{1}{(2\pi)^{NM}|\tilde{C}|} e^{-(\tilde{Y}-\tilde{A})^H \tilde{C}^{-1}(\tilde{Y}-\tilde{A})}, \quad (24)$$

where $\tilde{C}$ is the covariance matrix of $\tilde{Y}$.

$$\tilde{C} = E[(\eta+\tilde{n})(\eta+\tilde{n})^H]. \quad (25)$$

If a moving point target is assumed, we can simplify the measurement signal. A point target reflects with the same amplitude so and the same phase $\phi_0$ for all directions and over the entire frequency band. The amplitude of the measured signal will only dependent on the distance to the sub-aperture center $R_{cm}$. The phase $\phi_0$ is random and distributed uniformly between 0 and $2\pi$. Under the point target approximation the signal vector can be expressed as $$\tilde{A} = s_0 e^{j\phi_0} \tilde{A} \quad (26)$$

$\tilde{A}$ is the steering vector given by $$\tilde{A} = \begin{bmatrix} \dfrac{e^{jk_1 r_1}}{R_{c1}^2} \\ \dfrac{e^{jk_1(r_1+d(\cos\varphi_1-\cos\varphi'_1))}}{R_{c1}^2} \\ \vdots \\ \dfrac{e^{jk_1(r_1+(L-1)d(\cos\varphi_1-\cos\varphi'_1))}}{R_{c1}^2} \\ \dfrac{e^{jk_2 r_1}}{R_{c1}^2} \\ \vdots \\ \dfrac{e^{jk_N(r_1+d(\cos\varphi_1-\cos\varphi'_1))}}{R_{c1}^2} \\ \vdots \\ \dfrac{e^{jk_N(r_M+(L-1)d(\cos\varphi_M-\cos\varphi'_M))}}{R_{cM}^2} \end{bmatrix} \quad (27)$$

where the distance $r_m = r(\phi_m)$ is the local distance. Since $\phi_0$ is random the likelihood ratio test is given by $$E_\phi[\Lambda(\tilde{Y})] = \int_0^{2\pi} \Lambda(\tilde{Y} \mid \phi_0) \frac{d\phi_0}{2\pi} \quad (28)$$

The test variable is $$|\tilde{A}^H \tilde{C}^{-1} \tilde{Y}|^2 \underset{H_0}{\overset{H_1}{\gtrless}} \lambda \quad (29)$$

The covariance matrix is dependent on the clutter covariance and the noise. The clutter noise and the receiver noise can be considered as independent $$\tilde{C} = E[\tilde{Y}\tilde{Y}^H] = E[\tilde{\eta}\tilde{\eta}^H] + E[\tilde{n}\tilde{n}^H] \quad (30)$$

The receiver noise samples $\bar{n}_l(r_n)$ are independent both in $r_n$ and l. The clutter signal $\bar{\eta}(m, r_n)$ is dependent in l, independent in m and $r_n$. The sub-aperture beams are formed by non overlapping samples, which are independent (independent looks). The Fourier transformation will cause dependency on $\vec{k}$ both for $\eta$ and $\tilde{n}$. However these dependencies are probable weak so we assume the samples to be independent in $\vec{k}$. The covariance will simplify to $$\tilde{C} = \begin{bmatrix} C_{11} & 0 & \cdots & 0 & 0 & \cdots & 0 \\ 0 & C_{21} & \cdots & 0 & 0 & \cdots & 0 \\ \vdots & \vdots & \ddots & \vdots & \vdots & \cdots & \vdots \\ 0 & 0 & & C_{N1} & 0 & \cdots & 0 \\ 0 & 0 & \vdots & 0 & C_{12} & \cdots & 0 \\ \vdots & \vdots & \vdots & \vdots & \vdots & \ddots & \vdots \\ 0 & 0 & 0 & 0 & 0 & \cdots & C_{NM} \end{bmatrix} \quad (31)$$

where the diagonal matrixes $$C_{nm} = E[\vec{\eta}_{nm} \vec{\eta}_{nm}^H] + E[\vec{n}_{nm} \vec{n}_{nm}^H], \quad (32)$$

where the clutter $\vec{\eta}_{nm}$ and the noise $\vec{n}_{nm}$ is indexed the same as the measurement vector $\vec{Y}_{nm}$ which, for a particular frequency and direction, is $$\vec{Y}_{nm} = \begin{bmatrix} Y_1(k_n, \varphi_m, \varphi'_m) \\ Y_2(k_n, \varphi_m, \varphi'_m) \\ \vdots \\ Y_L(k_n, \varphi_m, \varphi'_m) \end{bmatrix} \quad (33)$$

The likelihood ratio test can then be reduced to $$|\vec{A}^H \tilde{C}^{-1} \vec{Y}|^2 = \left| \sum_{m=1}^{M} \sum_{n=1}^{N} \vec{A}_{nm}^H C_{nm}^{-1} \vec{Y}_{nm} \right|^2 \underset{H_0}{\overset{H_1}{\gtrless}} \lambda \quad (34)$$

where the steering end up as a vector dependent on m and n.

$$\vec{A}_{nm} = \frac{e^{-jk_n r_m}}{R_{cm}^2} \begin{bmatrix} 1 \\ e^{-jk_n d(\cos\varphi_m - \cos\varphi'_m)} \\ \vdots \\ e^{-jk_n(L-1)d(\cos\varphi_m - \cos\varphi'_m)} \end{bmatrix} = \frac{e^{-jk_n r_m}}{R_{cm}^2} \vec{A}_{nm} \quad (35)$$

The detector filter variable will be $$F(\Delta, \alpha) = \sum_{m=1}^{M} \sum_{n=1}^{N} \vec{A}_{nm}^H C_{nm}^{-1} \vec{Y}_{nm} \quad (36)$$

and the expectation value will be $$E[F(\Delta, \alpha)] = s_0 e^{j\phi_0} \sum_{m=1}^{M} \sum_{n=1}^{N} \vec{A}_{nm}^H C_{nm}^{-1} \vec{A}_{nm} \quad (37)$$

What is the expectation value given in (37)? To illustrate this we form the product, which is equal to the expectation value when $r'_m = r_m$ $$s_0 e^{j\phi_0} \sum_{m=1}^{M} \frac{1}{R_{cm}^2} \sum_{n=1}^{N} e^{jk_n r'_m} \vec{A}_{nm}^H C_{nm}^{-1} \vec{A}_{nm} e^{-jk_n r_m} \quad (38)$$

Because the covariance matrix $C_{nm}^{-1}$ is Hermitian and positive definite the product $$\vec{A}_{nm}^H C_{nm}^{-1} \vec{A}_{nm} \left| \vec{A}_{nm}^H C_{nm}^{-1} \vec{A}_{nm} \right|.$$

In case of maximum likelihood we match the distance walk between the sub-apertures. To match the distance walk with a phase shift in frequency is a SAR process. According to section 3 above, $r_m$ is connected to the relative speed $\gamma$. To test we therefore use the methods developed in sections 1–3. To illustrate we assume the signal to be so strong that the noise can be neglected, let $$F_{mn} = \vec{A}_{mn}^H C_{mn}^{-1} \vec{A}_{mn} \quad$$

and we write $$y'(m, r'_m) = \sum_{n=1}^{N} e^{jk_n r'_m} F_{nm} e^{-jk_n r_m} = g'(r'_m - r_m) \quad (39)$$

where $$g'(r'_m) = \sum_{n=1}^{N} F_{nm} e^{jk_n r'_m} \quad (40)$$

The test then is $$|h'(x, \rho)| \underset{H_0}{\overset{H_1}{\gtrless}} \lambda \quad (41)$$

where $$h'(x, \rho) = \sum_{m=1}^{M} y'\left(m, \frac{\Delta x(x_m - x_c) + \Delta \rho \rho_c}{R_{cm}} - \Delta r_m\right) \quad (42)$$

Figure 8:
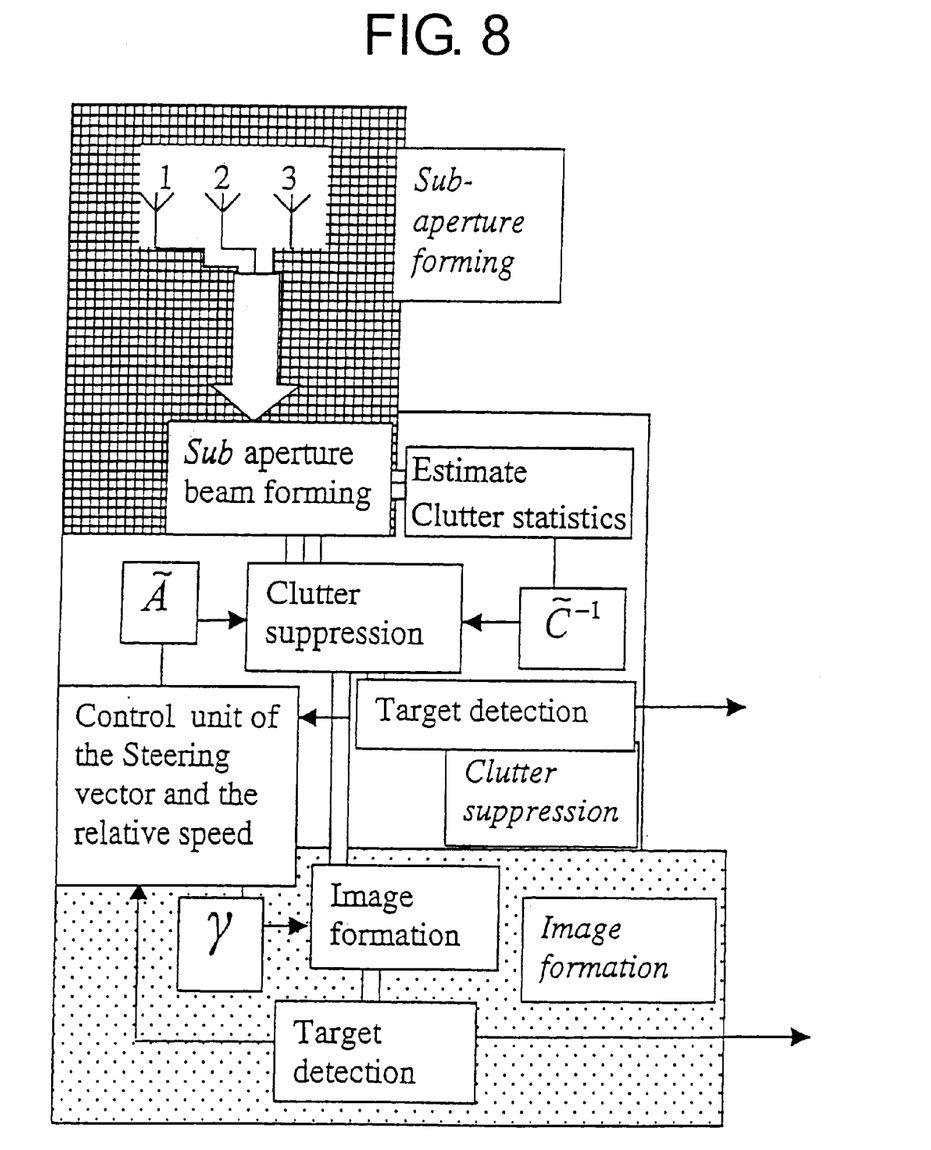
FIG. 8 shows one embodiment of the invention of a detection scheme of moving targets and FIG. 9 shows a sub-aperture beam and surrounding sub-aperture beams used to estimate the clutter statistics of the first sub-aperture beam.

One embodiment of a detection scheme for moving target is shown in FIG. 8. The system is built of two or more channels, and is, in this case, illustrated for three, 1,2,3.

First sub-aperture beams are formed for each channel. Normally they are formed for ground speed, as discussed above and shown in FIG. 3. The sub-images are then related to a specific area on the ground. The proposed method is adaptive by using measured data to estimate the clutter statistics.

Figure 9:
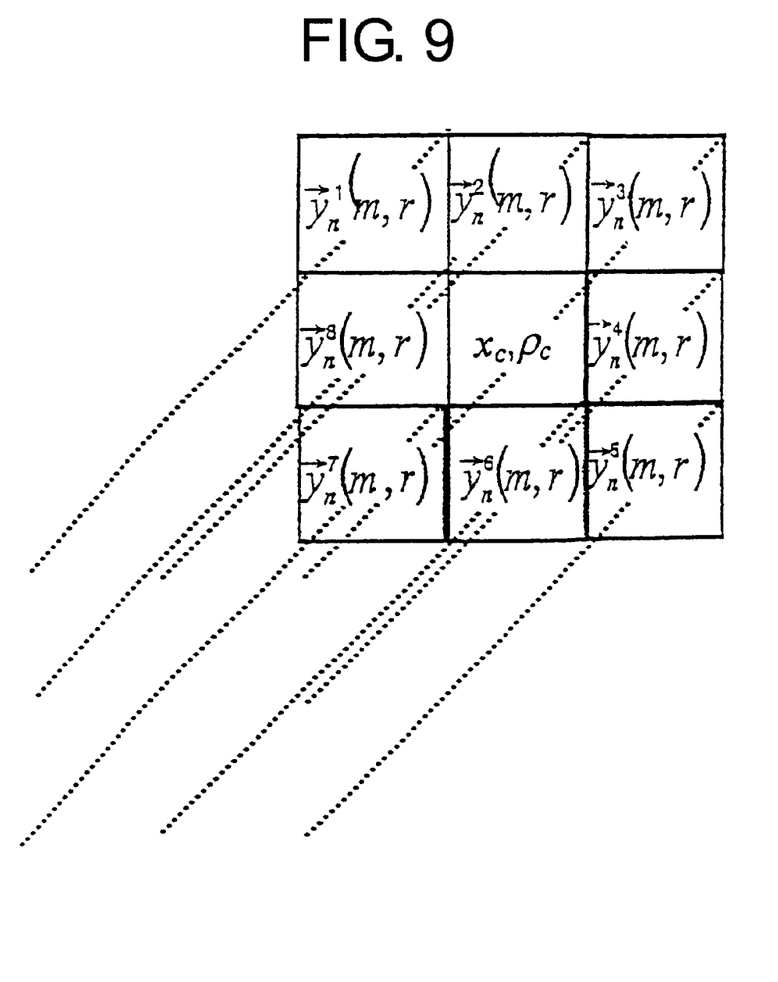

A first method to estimate the clutter statistics of the sub-aperture beam for a sub-image with the point $(x_0, \rho_0)$ is to use the surrounding sub-aperture beams connected to the surrounding sub images, cf. FIG. 9. The clutter statistics is in this case estimated from the maximum likelihood estimate of the covariance matrix $$C_n^p = E\left[\vec{Y}_n^p \vec{Y}_n^{pH}\right] \approx \frac{1}{S} \sum_{p=1}^{S} \vec{Y}_n^p \vec{Y}_n^{pH}, \quad (43)$$

where p is the index of the sub aperture connected to the surrounding sub-image p. The algorithm will automatically compensate for the differences between the antenna channels. The covariance matrix $\tilde{C}$ is inverted $\tilde{C}^{-1}$ and used, together with the steering vector Ã, in (29) or (34). In this step it is possible to detect moving targets. To increase the detection possibility the clutter suppressed signal are combined for different relative speeds γ. In the formed images moving targets with different relative speed can be found and imaged.

There is a second method to estimate the clutter statistics to be used in connection with the method in FIG. 8. The sub-aperture beam for a sub-image with the point $(x_0, \rho_0)$ is divided into range bins. A range bin is a range interval having a number of range samples. Under the assumption that the clutter signal is much stronger than the target signal, the covariance is estimated between the channels by the maximum likelihood estimate of the covariance, which means the use of equation (43), with p, in this case, being the index for the sub-aperture bins.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of detecting moving targets using a synthetic aperture radar (SAR) system having a platform which moves over a number of objects and supports radar equipment which reproduces the objects using a fast backprojection synthetic aperture technique via at least two antennas, said method comprising steps in the following order:

forming sub-aperture beams over said two antennas at a speed;

performing clutter suppression on said sub-aperture beams; and detecting moving targets using said clutter-suppressed sub-aperture beams.

2. The method as set forth in claim 1, wherein the speed is ground speed of said platform moving over said objects.

3. The method as set forth in claim 1, wherein said step of performing clutter suppression includes GMTI filtering.

4. The method as set forth in claim 1, wherein the step of detecting moving targets includes combining the clutter-suppressed sub-aperture beams by relative speed.

5. The method as set forth in claim 1, wherein the step of performing clutter suppression includes estimating the clutter statistics of the sub-aperture beams.

6. The method as set forth in claim 4, wherein said clutter statistics are estimated by means of a covariance matrix ($\tilde{C}$), the matrix being inverted ($\tilde{C}^{-1}$) and used, together with a steering vector ($\tilde{A}$), in the test $$|\tilde{A}^H \tilde{C}^{-1} \tilde{Y}|^2 \underset{H_0}{\overset{H_1}{\gtrless}} \lambda.$$

7. The method as set forth in claim 4, wherein the clutter statistics of a sub-image beam are estimated from surrounding sub-aperture beams connected to surrounding sub images.

8. The method as set forth in claim 4, wherein the sub-aperture beams are divided into range bins and the estimation of the clutter statistics is performed for said bins.

9. A method of detecting moving targets using a synthetic aperture radar (SAR) system, comprising the steps of;

moving radar equipment over a number of objects and reproducing the objects with a fast backprojection synthetic aperture technique, without requirement as to directivity or fractional bandwidth, using at least two antennas;

forming, using said two antennas, sub-aperture beams at a speed;

performing clutter suppression with GMTI filtering on said sub-aperture beams, said clutter suppression including estimation of clutter statistics of said sub-aperture beams; and detecting moving targets using said clutter-suppressed sub-aperture beams.

10. The method as set forth in claim 9, wherein the step of detecting moving targets includes combining the clutter-suppressed sub-aperture beams by relative speed.

11. The method as set forth in claim 9, wherein said clutter statistics are estimated by means of a covariance matrix ($\tilde{C}$), the matrix being inverted ($\tilde{C}^{-1}$) and used, together with a steering vector ($\tilde{A}$), in the test $$|\tilde{A}^H \tilde{C}^{-1} \tilde{Y}|^2 \underset{H_0}{\overset{H_1}{\gtrless}} \lambda.$$

12. The method as set forth in claim 9, wherein the clutter statistics of a sub-image beam are estimated from surrounding sub-aperture beams connected to surrounding sub images.

13. The method as set forth in claim 9, wherein the sub-aperture beams are divided into range bins and the estimation of the clutter statistics is performed for said bins.

* * * * *